United States Patent
Kotajima

(10) Patent No.: US 7,492,067 B2
(45) Date of Patent: Feb. 17, 2009

(54) STATOR FOR OUTER ROTOR MULTIPOLE GENERATOR AND METHOD OF ASSEMBLING THE STATOR

(75) Inventor: Hitoshi Kotajima, Gunma (JP)

(73) Assignee: Sawafuji Electric Co., Ltd., Tokyo (JP)

( * ) Notice: Subject to any disclaimer, the term of this patent is extended or adjusted under 35 U.S.C. 154(b) by 248 days.

(21) Appl. No.: 10/528,799

(22) PCT Filed: Sep. 24, 2003

(86) PCT No.: PCT/JP03/12161

§ 371 (c)(1),
(2), (4) Date: Sep. 16, 2005

(87) PCT Pub. No.: WO2004/030180

PCT Pub. Date: Apr. 8, 2004

(65) Prior Publication Data

US 2006/0103247 A1    May 18, 2006

(30) Foreign Application Priority Data

Sep. 24, 2002    (JP)    ............................. 2002-277805

(51) Int. Cl.
*H02K 11/00*    (2006.01)
*H02K 3/00*    (2006.01)
(52) U.S. Cl. ........................................... 310/71; 29/597
(58) Field of Classification Search ............... 310/71
See application file for complete search history.

(56) References Cited

U.S. PATENT DOCUMENTS 5,606,208 A    2/1997    Sakashita et al.

(Continued)

FOREIGN PATENT DOCUMENTS

CN    1219794 A    6/1999

(Continued)

*Primary Examiner*—Karl I Tamai
*Assistant Examiner*—Naishadh N Desai
(74) *Attorney, Agent, or Firm*—Arent Fox, LLP

(57) ABSTRACT

An outer rotor type multi-pole generator stator is provided in which a lead wire extending from a coil is connected by fusing to a connecting terminal fitted into and fixed to a bobbin wherein, in order to avoid the lead wire becoming slack after connection by fusing and enable assembly of the stator to be carried out efficiently, the connecting terminal (32) is formed from an external conductor connection terminal portion (32*a*) that is fitted into and fixed to a fitting hole (31), a connecting plate portion (32*b*) having one end thereof connected at right angles to the external conductor connection terminal portion (32*a*) and extending toward the radially inner side of the stator, and a clamping plate portion (32*c*) provided so as to be connected to the connecting plate portion (32*b*) so that the lead wire (33) can be held between the clamping plate portion (32*c*) and the other end portion of the connecting plate portion (32*b*) and connected by fusing, and the bobbin (24) is provided on the inner periphery thereof with a channel (43) having one end thereof facing the other end of the connecting plate portion (32*b*) and opposite ends thereof open so that one electrode of a pair of electrodes (44, 45) for connecting by fusing can be inserted through the channel (43).

4 Claims, 9 Drawing Sheets

U.S. PATENT DOCUMENTS

| | | | |
|---|---|---|---|
| 5,914,546 A * | 6/1999 | Terakado et al. | 310/71 |
| 6,030,260 A * | 2/2000 | Kikuchi et al. | 439/890 |
| 6,091,172 A * | 7/2000 | Kakinuma et al. | 310/71 |
| 6,455,962 B2 * | 9/2002 | Suzuki et al. | 310/71 |
| 6,800,973 B2 * | 10/2004 | Futami et al. | 310/71 |
| 2004/0061390 A1 * | 4/2004 | Baker-Bachman et al. | 310/71 |
| 2004/0150276 A1 * | 8/2004 | Yokoyama et al. | 310/71 |

FOREIGN PATENT DOCUMENTS

| | | |
|---|---|---|
| JP | 6-24365 A | 3/1994 |
| JP | 8-149774 A | 6/1996 |
| JP | 11-15094 | 6/1999 |
| JP | 11-150906 A | 6/1999 |
| JP | 2002-233094 A | 8/2002 |

* cited by examiner

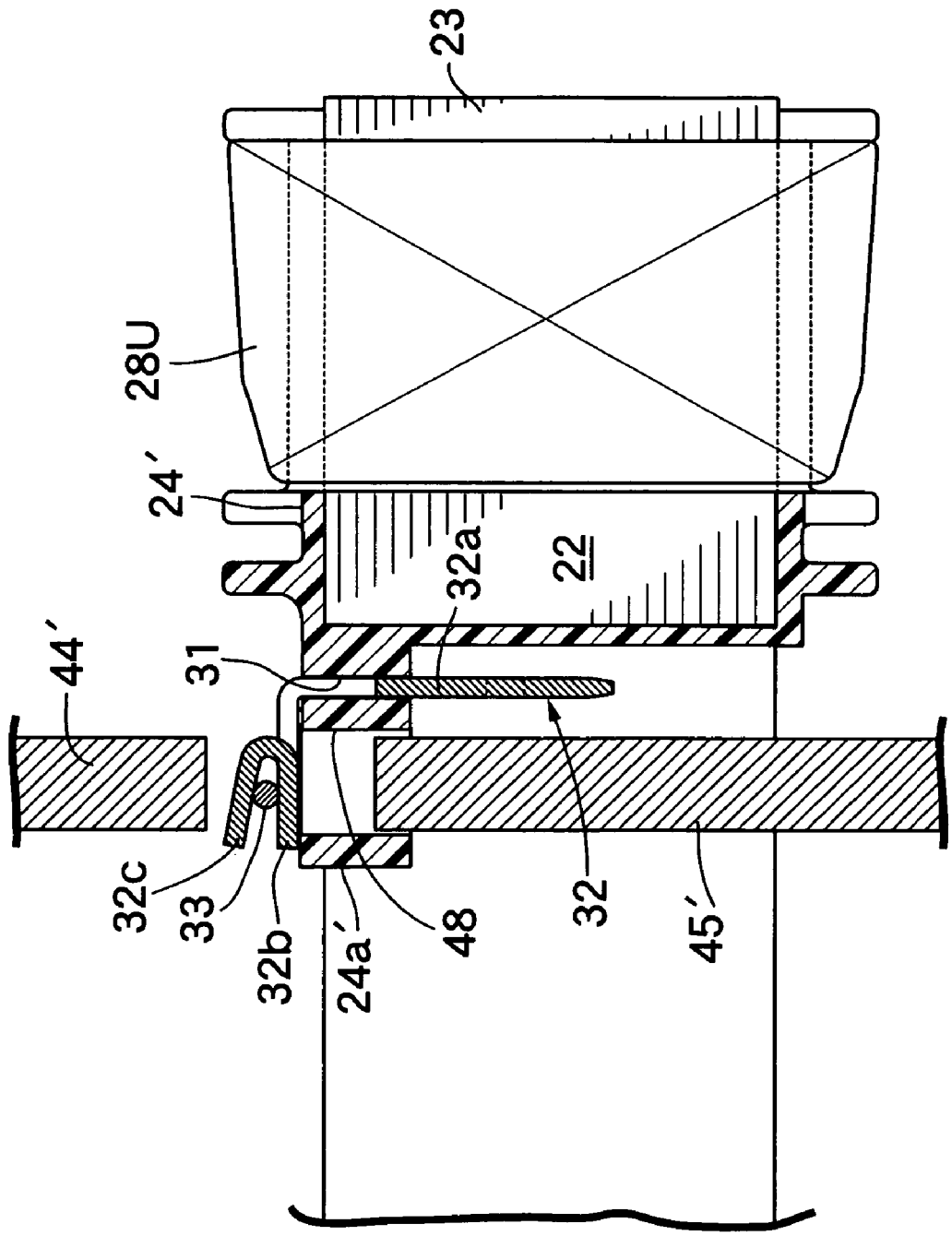

STATOR FOR OUTER ROTOR MULTIPOLE GENERATOR AND METHOD OF ASSEMBLING THE STATOR

CROSS-REFERENCE TO RELATED APPLICATION

This application is a National Stage entry of International Application No. PCT/JP2003/12161, filed Sep. 24, 2003, the disclosure of the prior application is hereby incorporated in its entirety by reference.

FIELD OF THE INVENTION

The present invention relates to an improvement of an outer rotor type multi-pole generator stator in which a plurality of coils are wound via a bobbin around a large number of projecting poles provided on the outer periphery of a stator core, and a plurality of connecting terminals made of a conductive metal are fitted into and fixed to a plurality of fitting holes provided in the bobbin inwardly of the coils with respect to the radial direction of the stator core, each connecting terminal having one end thereof connected to an external conductor and having the other end thereof connected by fusing to a lead wire extending from the coil, and to an improvement of an assembly method for the outer rotor type multi-pole generator stator.

BACKGROUND ART

When a lead wire extending from a coil is connected by fusing to a connecting terminal, it is necessary to hold a coil connection terminal portion of the connecting terminal from opposite sides with electrodes; a conventional connecting terminal, as disclosed in, for example, Japanese Patent Application Laid-open No. 11-150906, is formed from an external conductor connection terminal portion that is fitted into and fixed to a fitting hole, a connecting plate portion connected at right angles to the external conductor connection terminal portion, and a coil connection terminal portion provided so as to be connected to the connecting plate portion, and in order to make the electrodes operate while avoiding interference with a bobbin, the coil connection terminal portion is connected at right angles to the other end of the connecting plate portion before connecting a lead wire by fusing, and bent so as to overlap the connecting plate portion after connecting the lead wire by fusing.

DISCLOSURE OF INVENTION

However, in this conventional stator, the lead wire of the coil is connected by fusing to the coil connection terminal portion in a state in which the external conductor connection terminal portion of the connecting terminal is provisionally inserted into the fitting hole, the external conductor connection terminal portion is then fitted into and fixed to the fitting hole, and the coil connection terminal portion is then bent so as to overlap the connecting plate portion.

Due to this bending of the coil connection terminal portion after connecting the lead wire by fusing, the lead wire flexes between the coil and a part where the lead wire is connected to the coil connection terminal portion, thus causing a so-called loose wire.

Furthermore, since it is necessary for a step of catching the lead wire with the connecting terminal when the connecting terminal is provisionally inserted into the fitting hole and a step of cutting off a portion of the lead wire projecting from the connecting terminal after connecting by fusing and bending the connection terminal portion to be carried out in a different location from a fusing machine for connecting by fusing to the connecting terminal, it is necessary to move the location, and the time for the stator assembly operation process becomes long.

The present invention has been accomplished under the above-mentioned circumstances, and it is an object thereof to provide an outer rotor type multi-pole generator stator and an assembly method therefor, the stator giving no slack in a lead wire after connection by fusing to a connecting terminal, and enabling setting of the connecting terminal on a bobbin and connection by fusing of the lead wire to the connecting terminal to be carried out in the same location, thereby enabling assembly of the stator to be carried out efficiently.

In order to attain this object, in accordance with a first aspect of the present invention, there is provided an outer rotor type multi-pole generator stator in which a plurality of coils are wound via a bobbin around a large number of projecting poles provided on the outer periphery of a stator core, and a plurality of connecting terminals made of a conductive metal are fitted into and fixed to a plurality of fitting holes provided in the bobbin inwardly of the coils with respect to the radial direction of the stator core, each connecting terminal having one end thereof connected to an external conductor and having the other end thereof connected by fusing to a lead wire extending from the coil, characterized in that each of the connecting terminals is formed from an external conductor connection terminal portion that is fitted into and fixed to the fitting hole so that one end thereof connected to the external conductor projects from the fitting hole, a flat connecting plate portion having one end thereof connected at right angles to the other end of the external conductor connection terminal portion and extending toward the radially inner side of the stator, and a clamping plate portion provided so as to be connected to the connecting plate portion so that the lead wire can be held between the clamping plate portion and the other end portion of the connecting plate portion and connected by fusing, and the bobbin is provided with a channel or a through hole having one end thereof facing said other end of the connecting plate portion and opposite ends thereof open so that one electrode of a pair of electrodes for connecting by fusing can be inserted through the channel or through hole.

In accordance with the arrangement of the first aspect, since one electrode of the pair of electrodes for connecting by fusing can pass through the channel or the through hole, it is possible to hold the lead wire from the coil between said other end portion of the connecting plate portion and the clamping plate portion and connected it by fusing in a state in which the connecting terminal is fitted into and fixed to the bobbin, and it is unnecessary to carry out bending of a part of the connecting terminal after connecting by fusing. It is therefore possible to prevent the lead wire from flexing between the coil and a part connected to the connecting terminal, a so-called loose wire does not occur, and it is therefore unnecessary to subject the lead wire to a treatment such as covering with an insulating tube. Furthermore, since a pair of thick electrodes can be used for connecting by fusing, it is possible to reduce the time for connecting by fusing by applying a large current, thus further improving the efficiency of assembly.

Furthermore, in accordance with a second aspect of the present invention, in addition to the first aspect, there is provided the outer rotor type multi-pole generator stator, wherein the connecting plate portion is formed in a trapezoidal shape whose width decreases in going toward the radially inner side of the stator; in accordance with this arrangement, it is possible for a plurality of connecting terminals to be disposed in close proximity to each other along the peripheral direction of the stator while ensuring that there is an insulating distance between adjacent connecting terminals, thus contributing to a reduction in the dimensions of the stator.

Moreover, in accordance with a third aspect of the present invention, there is provided an assembly method for the outer rotor type multi-pole generator stator according to the first or second aspect wherein, when carrying out assembly of the connecting terminals to the bobbin and connecting the lead wire by fusing to the connecting terminal the method includes, in sequence, a step of fixing each of the connecting terminals to the bobbin by fitting the external conductor connection terminal portion into the fitting hole until the connecting plate portion abuts against the bobbin, a step of catching the lead wire with the clamping plate portion so as to be held between the connecting plate portion and the clamping plate portion, a step of carrying out connecting by fusing while clamping the connecting plate portion and the clamping plate portion under pressure by means of a pair of electrodes so that one of the electrodes is inserted into the channel or the through hole, and a step of cutting off an unwanted portion of the lead wire projecting from the connecting terminal.

In accordance with the arrangement of the third aspect, by carrying out connecting by fusing by holding the lead wire from the coil between the connecting plate portion and the clamping plate portion while fitting and fixing the connecting terminal to the bobbin, it is unnecessary to carry out bending of a part of the connecting terminal after connecting by fusing, the lead wire does not flex between the coil and the part connected to the connecting terminal, a so-called loose wire does not occur, and it is unnecessary to carry out a treatment such as covering the lead wire with an insulating tube. Furthermore, the connecting terminal can be fixed to the bobbin and the unwanted portion of the lead wire can be cut off after fusing in a state in which the bobbin is set in a fusing machine for connecting by fusing, thereby improving the efficiency of assembly of the stator.

BRIEF DESCRIPTION OF DRAWINGS

FIG. 1 is a vertical sectional view of an outer rotor type multi-pole generator, FIG. 2 is a front view of a stator, FIG. 3 is a sectional view along line 3-3 in FIG. 2, FIG. 4 is a developed view of a winding to a plurality of projecting poles, FIG. 5 is a perspective view of a connecting terminal, FIG. 6 is a sectional view for explaining assembly of the connecting terminal to the stator and connection of a lead wire to the connecting terminal, and FIG. 7 is a perspective view of another connecting terminal.

FIG. 8 and FIG. 9 illustrate a second embodiment of the present invention; FIG. 8 is a front view, corresponding to FIG. 2 of the first embodiment, of a stator, and FIG. 9 is a sectional view corresponding to FIG. 6 of the first embodiment.

BEST MODE FOR CARRYING OUT THE INVENTION

Modes for carrying out the present invention are explained below with reference to embodiments of the present invention shown in the attached drawings.

Figure 1:
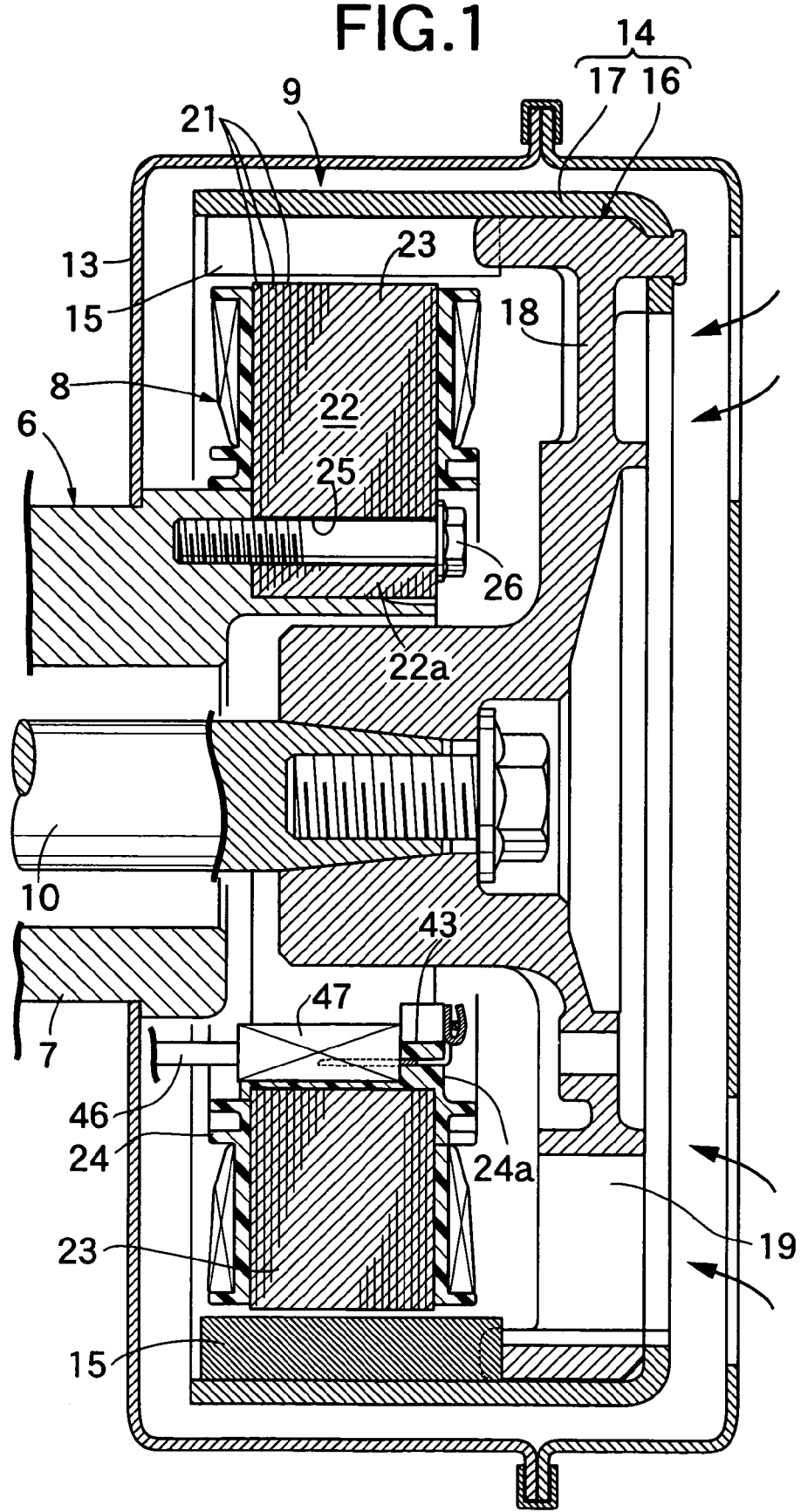
FIG. 1 to FIG. 7 illustrate a first embodiment of the present invention.

A first embodiment of the present invention is now explained with reference to FIG. 1 to FIG. 7; in FIG. 1, this outer rotor type multi-pole generator is used as, for example, an engine generator, and includes a stator 8 mounted on an engine main body 6 via a hollow support 7, and a rotor 9 covering the stator 8, the rotor 9 being fixed to an end of a crankshaft 10 running rotatably through the support 7 and arranged coaxially with the stator 8. Fixedly supported on the support 7 is a casing 13 covering the stator 8 and the rotor 9.

The rotor 9 is formed by fixedly attaching a plurality of magnets 15 to the inner periphery of a bottomed cylindrical rotor yoke 14 coaxially covering the stator 8, and a central part of a closed end of the rotor yoke 14 is fixed coaxially to the end of the crankshaft 10.

The rotor yoke 14 is formed from a disk-shaped end wall member 16 die-cast from a light alloy of aluminum, etc., and a cylindrical member 17 made of, for example, mild steel into a cylindrical shape coaxially covering the stator 8, the cylindrical member 17 being fixed through one end thereof to an outer peripheral part of the end wall member 16 and the plurality of magnets 15 being fixedly attached to the inner periphery thereof, and a central part of the end wall member 16 is fixed to the crankshaft 10 so as to be coaxial therewith.

Provided integrally with the end wall member 16 are a plurality of fins 18 that extend radially so as to form intake openings 19 therebetween. Cooling air therefore passes through the interior of the casing 13 accompanying rotation of the rotor 9, and compared with an arrangement in which the rotor 9 is equipped with a cooling fan, the number of components can be reduced and the efficiency of assembly can be improved. Moreover, it is unnecessary to ensure that there is a space, other than the rotor 9, exclusively used for generating cooling air, it is unnecessary to set the length of the crankshaft 10 at a relatively large value, it is possible to avoid a reduction in the rigidity with which the rotor 9 is supported, and it is possible to set the overall axial length of the generator at a small value. Furthermore, while optimizing the weight of the rotor 9 by means of the intake openings 19, cooling air for passing through the stator 8 is reliably generated by the fins 18 accompanying rotation of the rotor 9, thereby avoiding a reduction in efficiency.

Figure 2:
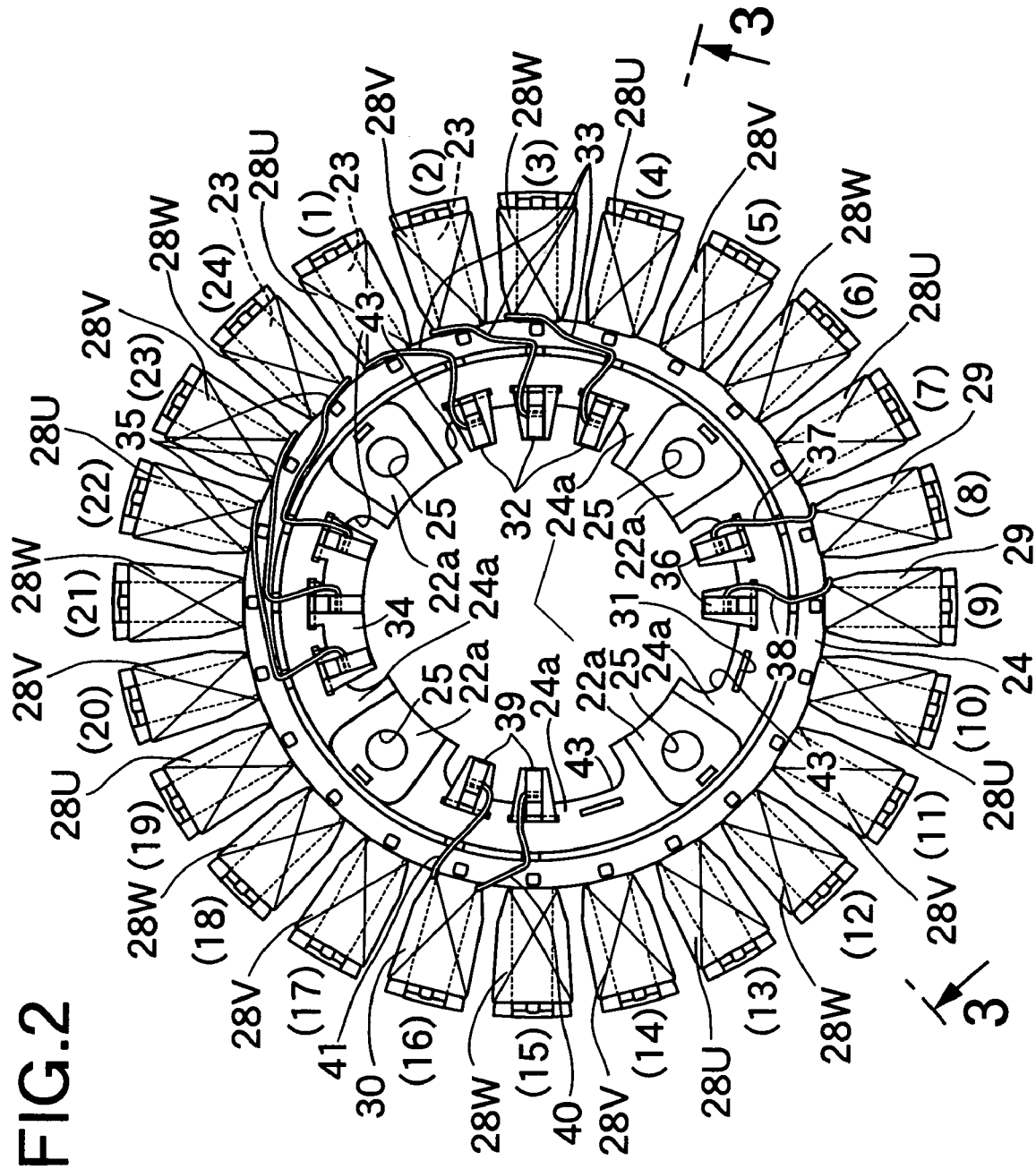
Figure 3:
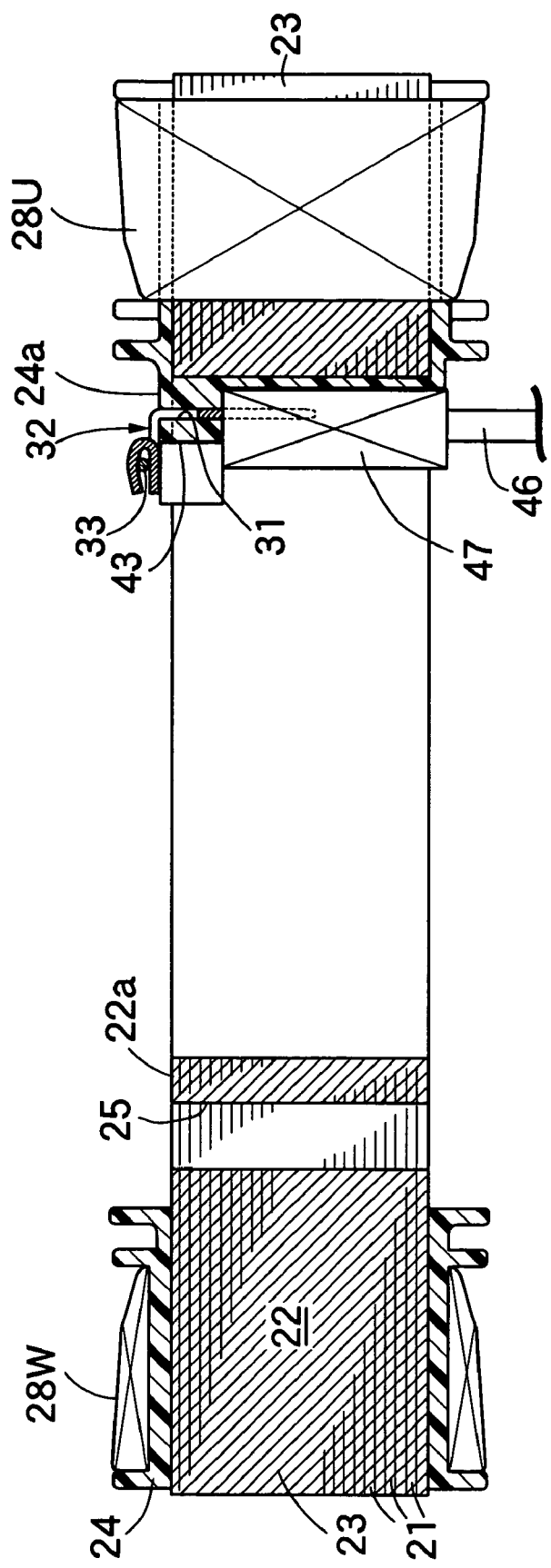

Referring in addition to FIG. 2 and FIG. 3, the stator 8 includes a stator core 22 formed by laminating a plurality of ring-shaped core plates 21, and a plurality of, for example, twenty-four, projecting poles 23 are projectingly provided with equal intervals therebetween on the outer periphery of the stator core 22, the projecting poles 23 having a substantially T-shaped form within a plane perpendicular to the axis of the stator core 22.

A majority of the stator core 22 is covered with a synthetic resin bobbin 24, the bobbin 24 being injection molded as a unit to cover the stator core 22 so that the extremity of each of the projecting poles 23 and a part of opposite end faces and an inner peripheral face of the stator core 22 are exposed.

Through holes 25 are provided in an inner peripheral part of the stator core 22 at four positions that are equally spaced in the peripheral direction of the stator core 22, and screwing a bolt 26 inserted into each of the through holes 25 into the support 7 allows the stator core 22 to be coaxially fixed to the support 7.

Sets of seven U-phase main coils 28U, V-phase main coils 28V, and W-phase main coils 28W, a pair of DC coils 29, and a single sub-coil 30 are wound around parts of the bobbin 24 corresponding the projecting poles 23.

Figure 4:
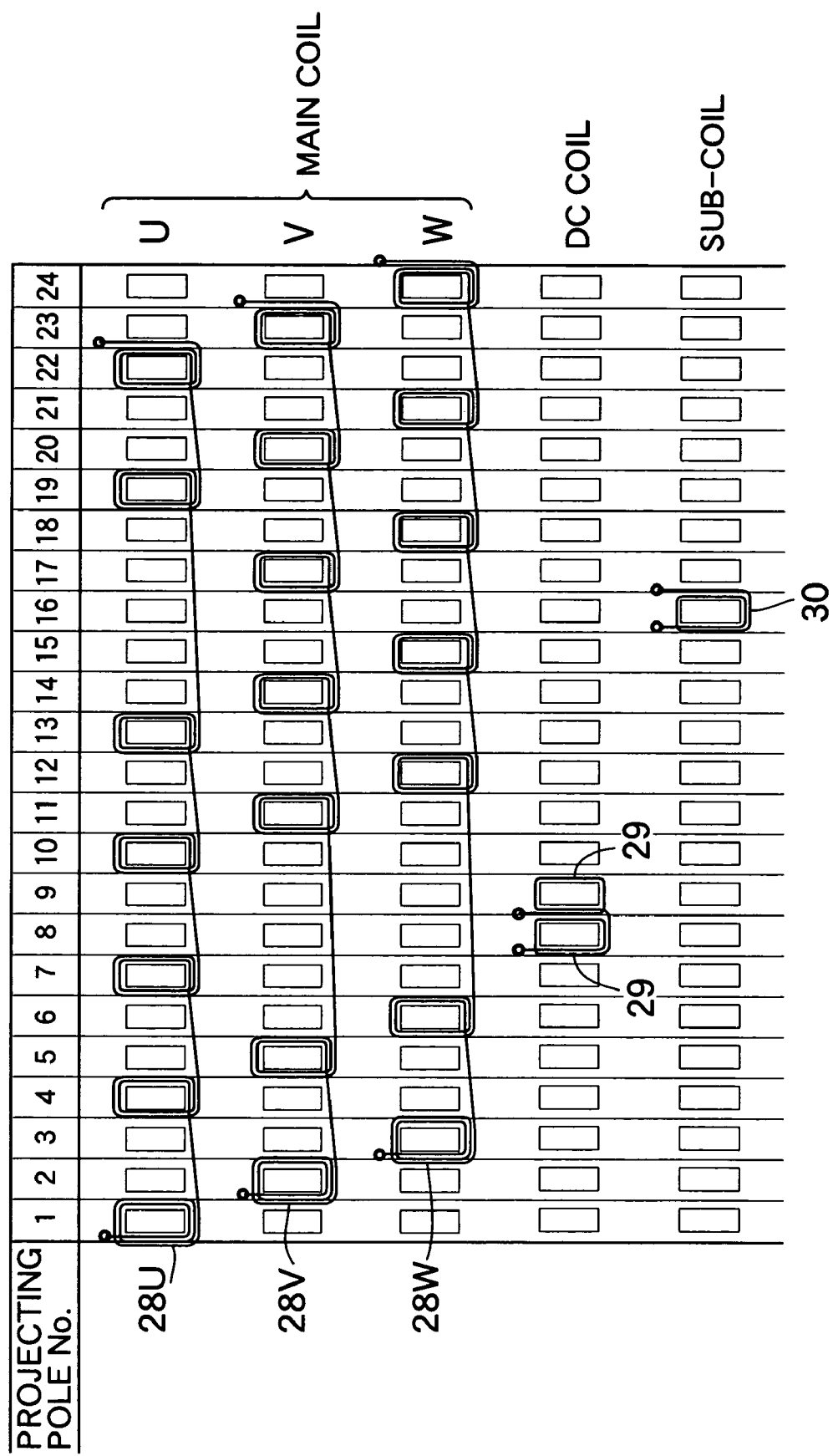

Referring in addition to FIG. 4, an explanation is given by designating one of the projecting poles 23 as No. 1 and then giving the other projecting poles 23 in the anticlockwise direction in FIG. 2 numbers up to No. 24. The U-phase main coils 28U are wound around the bobbin 24 in sections corresponding to the No. 1, No. 4, No. 7, No. 10, No. 13, No. 19, and No. 22 projecting poles 23 while being connected in series, the V-phase main coils 28V are wound around the bobbin 24 in sections corresponding to the No. 2, No. 5, No. 11, No. 14, No. 17, No. 20, and No. 23 projecting poles 23 while being connected in series, the W-phase main coils 28W are wound around the bobbin 24 in sections corresponding to the No. 3, No. 6, No. 12, No. 15, No. 18, No. 21, and No. 24 projecting poles 23 while being connected in series, the DC coils 29 are wound around the bobbin 24 in sections corresponding to the No. 8 and No. 9 projecting poles 23, and the sub-coil 30 is wound around the bobbin 24 in a section corresponding to the No. 16 projecting pole 23.

Projections 22a projecting inwardly in the direction of the stator core 22 are projectingly provided on the inner periphery of the stator core 22 in sections corresponding to the No. 6, No. 12, No. 18, and No. 14 projecting poles 23, and the through holes 25 are provided in the projections 22a.

The inner periphery at one end, close to the end wall member 16, of the stator core 22 is covered by the bobbin 24, and the bobbin 24 is integrally provided with four protrusions 24a protruding radially inwardly from the inner periphery between the projections 22a on one end of the bobbin 24.

Each of the protrusions 24a is provided with a plurality of, for example, three, fitting holes 31 at positions equidistant from the center of the bobbin 24, the fitting holes 31 being disposed at equal intervals in the peripheral direction of the bobbin 24, and each of the fitting holes 31 being formed so as to have a rectangular cross-section that is long in a direction perpendicular to the radial direction of the bobbin 24. That is, the fitting holes 31 are provided on the bobbin 24 inwardly of the coils 28U, 28V, 28W, 29, and 30 with respect to the radial direction of the stator core 22.

Connecting terminals 32 are fixedly fitted in the fitting holes 31 provided in the protrusion 24a corresponding to the No. 2 to No. 4 projecting poles 23. Among the seven U-phase main coils 28U, which are connected in series, a lead wire 33 from the main coil 28U wound around the bobbin 24 in the section corresponding to the No. 1 projecting pole 23 is connected by fusing to the corresponding connecting terminal 32, among the seven V-phase main coils 28V, which are connected in series, a lead wire 33 from the main coil 28V wound around the bobbin 24 in the section corresponding to the No. 2 projecting pole 23 is connected by fusing to the corresponding connecting terminal 32, and among the seven W-phase main coils 28W, which are connected in series, a lead wire 33 from the main coil 28W wound around the bobbin 24 in the section corresponding to the No. 3 projecting pole 23 is connected by fusing to the corresponding connecting terminal 32.

A connecting terminal 34 is fixedly fitted in the fitting holes 31 provided in the protrusion 24a corresponding to the No. 20 to No. 22 projecting poles 23. Moreover, among the seven U-phase main coils 28U, which are connected in series, a lead wire 35 from the main coil 28U wound around the bobbin 24 in the section corresponding to the No. 22 projecting pole 23, among the seven V-phase main coils 28V, which are connected in series, a lead wire 35 from the main coil 28V wound around the bobbin 24 in the section corresponding to the No. 23 projecting pole 23, and among the seven W-phase main coils 28W, which are connected in series, a lead wire 35 from the main coil 28W wound around the bobbin 24 in the section corresponding to the No. 24 projecting pole 23 are connected by fusing in common to the connecting terminal 34.

That is, one end of each of the sets of seven U-phase, V-phase, and W-phase main coils 28U, 28V, and 28W, which are connected in series, is individually connected to the corresponding connecting terminal 32, and the other ends of the U-phase, V-phase, and W-phase main coils 28U, 28V, and 28W are connected in common to the connecting terminal 34, which serves as a neutral point.

Moreover, since said one end and said other end of each of the sets of seven U-phase, V-phase, and W-phase main coils 28U, 28V, and 28W, which are connected in series, are disposed at positions that are adjacent in the peripheral direction of the stator core 22, and the three connecting terminals 32 and the single connecting terminal 34 are also disposed at positions corresponding to said one end and said other end of each of the U-phase, V-phase, and W-phase main coils 28U, 28V, and 28W, it is possible to make the lead wires 33 and 35 from the U-phase, V-phase, and W-phase main coils 28U, 28V, and 28W relatively short, it is possible to prevent loose wires from occurring, and it is possible to prevent as much as possible the electrical characteristics from being degraded by loose wires.

Connecting terminals 36 are fitted into and fixed to, among the fitting holes 31 provided in the protrusion 24a corresponding to the No. 8 to No. 10 projecting poles 23, the fitting holes 31 corresponding to the No. 8 and No. 9 projecting poles 23, and lead wires 37 and 38 from opposite ends of the DC coils 29 connected in series and wound around the bobbin 24 in the sections corresponding to the No. 8 and No. 9 projecting poles 23 are each connected by fusing to the connecting terminals 36.

Moreover, since the connecting terminals 36 are disposed in portions close to the pair of DC coils 29, it is possible to make the lead wires 37 and 38 relatively short, it is possible to prevent loose wires from occurring, and it is possible to prevent as much as possible the electrical characteristics from being degraded by loose wires.

Furthermore, among the fitting holes 31 provided in the protrusion 24a corresponding to the No. 14 to No. 16 projecting poles 23, connecting terminals 39 are fitted into and fixed to the fitting holes 31 corresponding to the No. 15 and No. 16 projecting poles 23, and lead wires 40 and 41 from opposite ends of the sub-coil 30 wound around the bobbin 24 in the section corresponding to the No. 16 projecting pole 23 are each connected by fusing to the connecting terminals 39.

Figure 5:
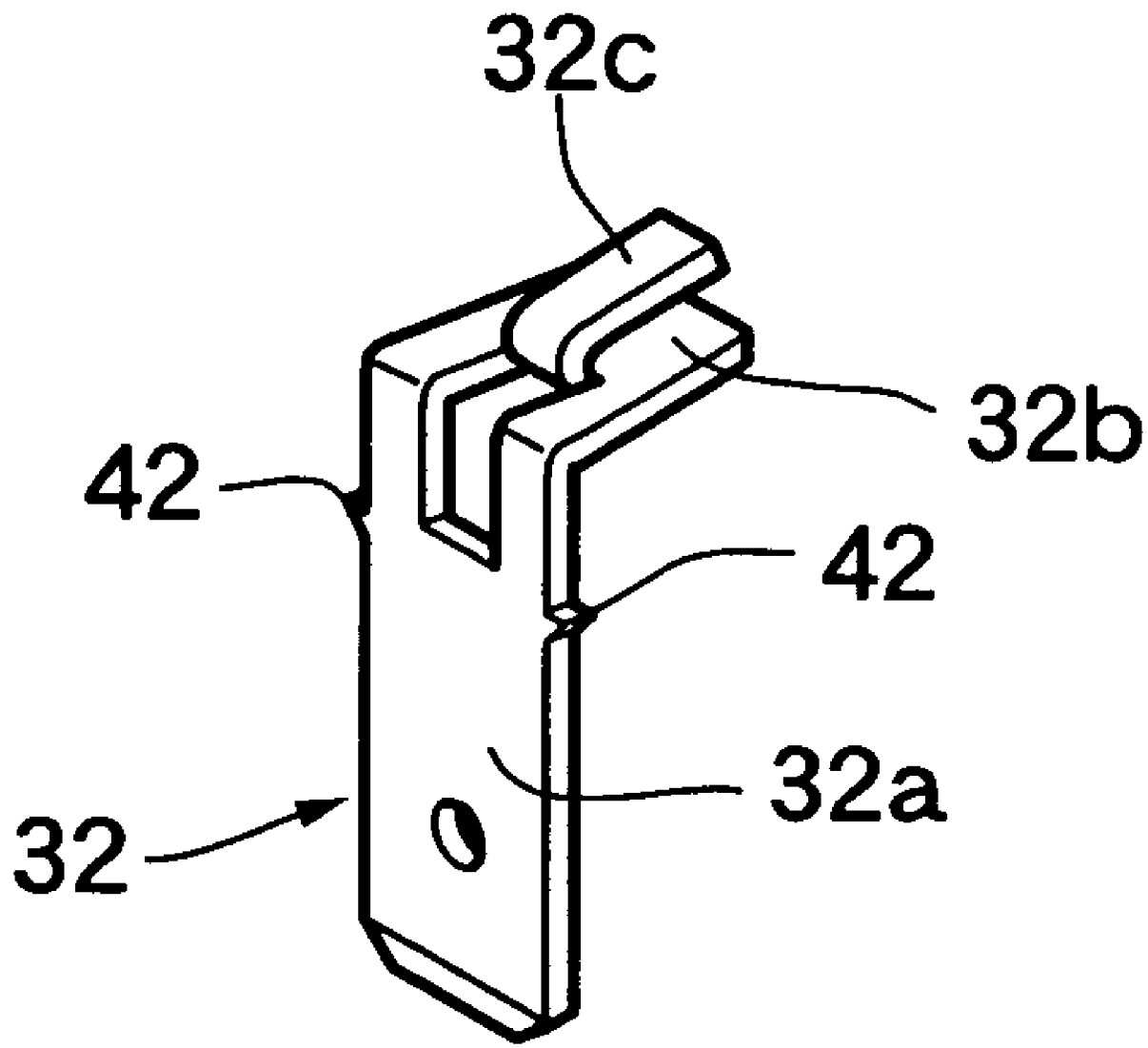

Moreover, since the connecting terminals 39 are disposed in portions close to the sub-coil 30, it is possible to make the lead wires 40 and 41 relatively short, it is possible to prevent loose wires from occurring, and it is possible to prevent as much as possible the electrical characteristics from being degraded by loose wires. In FIG. 5, the connecting terminal 32 is made of a conductive metal so as to have an integral external conductor connection terminal portion 32a that is fitted into and fixed to the fitting hole 31 so that one end thereof projects from the fitting hole 31, a flat connecting plate portion 32b having one end thereof connected at right angles to the other end of the external conductor connection terminal portion 32a and extending toward the radially inner side of the stator 8, and a clamping plate portion 32c provided so as to be connected to the connecting plate portion 32b so that the lead wire 33 can be held between the clamping plate portion 32c and the other end portion of the connecting plate portion 32b and connected by fusing.

Figure 6:
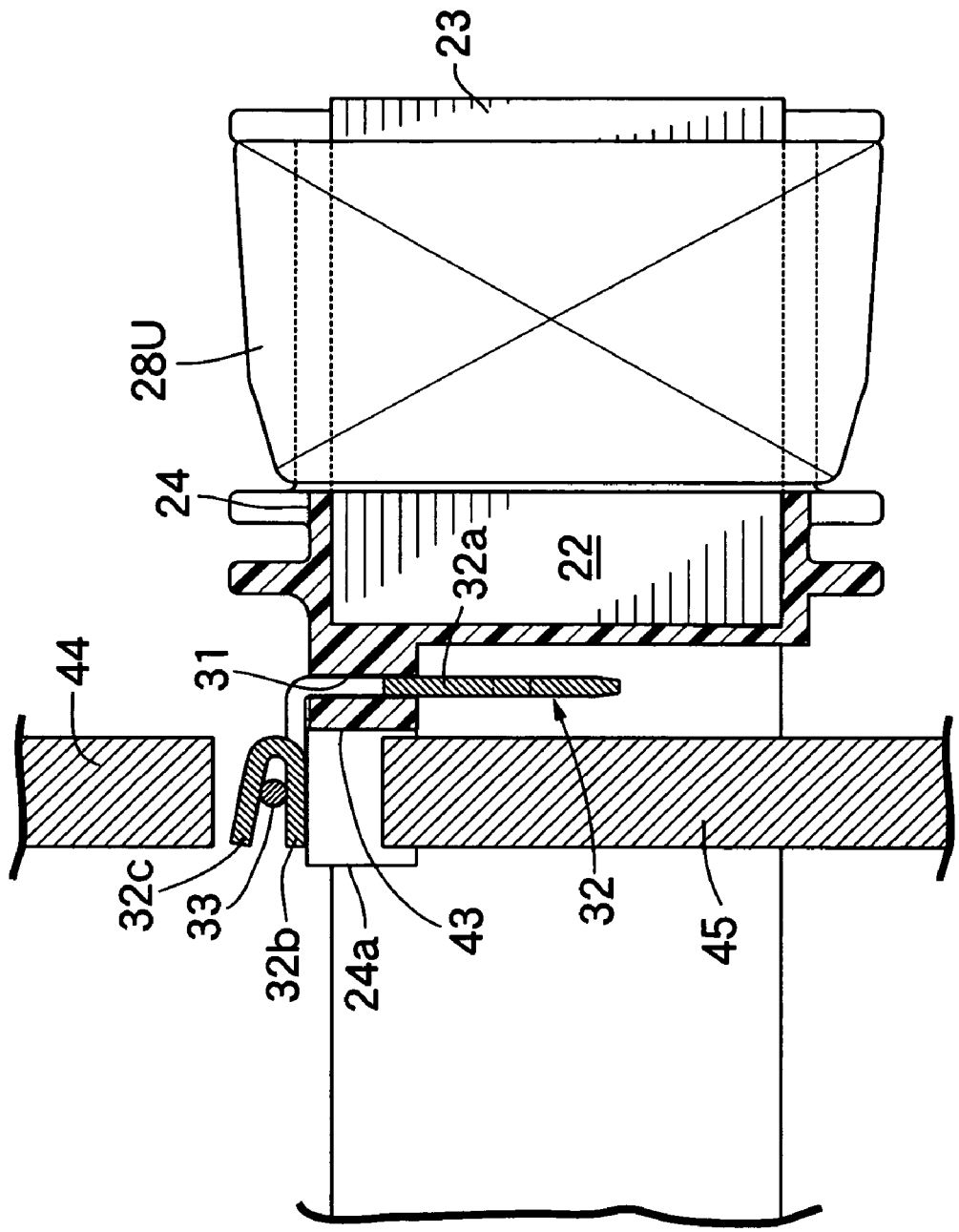

The external conductor connection terminal portion 32a is formed in a flat plate shape in order to be fitted into the fitting hole 31, and has its length set so that one end thereof projects from the fitting hole 31 when fitted into the fitting hole 31 until the connecting plate portion 32b abuts against the bobbin 24 as shown in FIG. 6. Moreover, a pair of barbs 42 are provided on opposite sides of the external conductor connection terminal portion 32a, the barbs 42 biting into inner faces on either side of the fitting hole 31 so as to prevent the external conductor connection terminal portion 32a from becoming detached from the fitting hole 31. The connecting plate portion 32b is provided so as to be connected at right angles to said other end of the external conductor connection terminal portion 32a so that, when the external conductor connection terminal portion 32a is fitted into the fitting holes 31, the connecting plate portion 32b abuts against one end face, on the end wall member 16 side, of the bobbin 24 and extends toward the radially inner side of the stator 8, and has a trapezoidal shape whose width reduces in going toward the radially inner side of the stator 8.

The clamping plate portion 32c is formed by punching upward a middle section in the width direction from said other end portion of the external conductor connection terminal portion 32a toward said one end portion of the connecting plate portion 32b so that the lead wire 33 can be held between the clamping plate portion 32c and said other end portion of the connecting plate portion 32b.

Moreover, the inner periphery of each of the protrusions 24a of the bobbin 24 is provided with a channel 43 having one end thereof facing the other end portion of the connecting plate portion 32b and having opposite ends thereof open so that one electrode 45 of a pair of electrodes 44 and 45 for connecting by fusing can pass through the channel 43.

Furthermore, the external conductor terminal portions 32a of the three connecting terminals 32 fitted into and fixed to the protrusion 24a project from the protrusion 24a toward the support 7, and a coupler 47 is resiliently fitted detachably into an inner peripheral part of the bobbin 24 from the other end of the bobbin 24, the coupler 47 connecting external conductors 46 individually to the external conductor terminal portions 32a.

When carrying out assembly of such a connecting terminal 32 to the bobbin 24 and connecting the lead wire 33 by fusing to the connecting terminal 32, a step of fixing the connecting terminal 32 to the bobbin 24 by fitting the external conductor connection terminal portion 32a into the fitting hole 31 until the connecting plate portion 32b abuts against the bobbin 24, a step of catching the lead wire 33 with the clamping plate portion 32c so that the wire is held between the connecting plate portion 32b and the clamping plate portion 32c, a step of carrying out connecting by fusing while clamping the connecting plate portion 32b and the clamping plate portion 32c under pressure by means of the pair of electrodes 44 and 45 so that one of the electrodes 45 is inserted into the channel 43, and a step of cutting off an unwanted portion of the lead wire 33 projecting from the connecting terminal 32 are carried out in sequence.

The other connecting terminals 36 and 39 are formed in the same manner as for the connecting terminal 32, assembly of the connecting terminals 36 and 39 to the bobbin 24 and connecting the lead wires 37, 38, 40, and 41 by fusing to the connecting terminals 36 and 39 can be carried out in the same manner as in the assembly of the connecting terminal 32 to the bobbin 24 and the connection of the lead wire 33 by fusing to the connecting terminal 32 and, furthermore, connection to an external conductor, which is not illustrated, can be carried out in the same manner as in the connection of the connecting terminal 32 and the external conductors 46.

Figure 7:
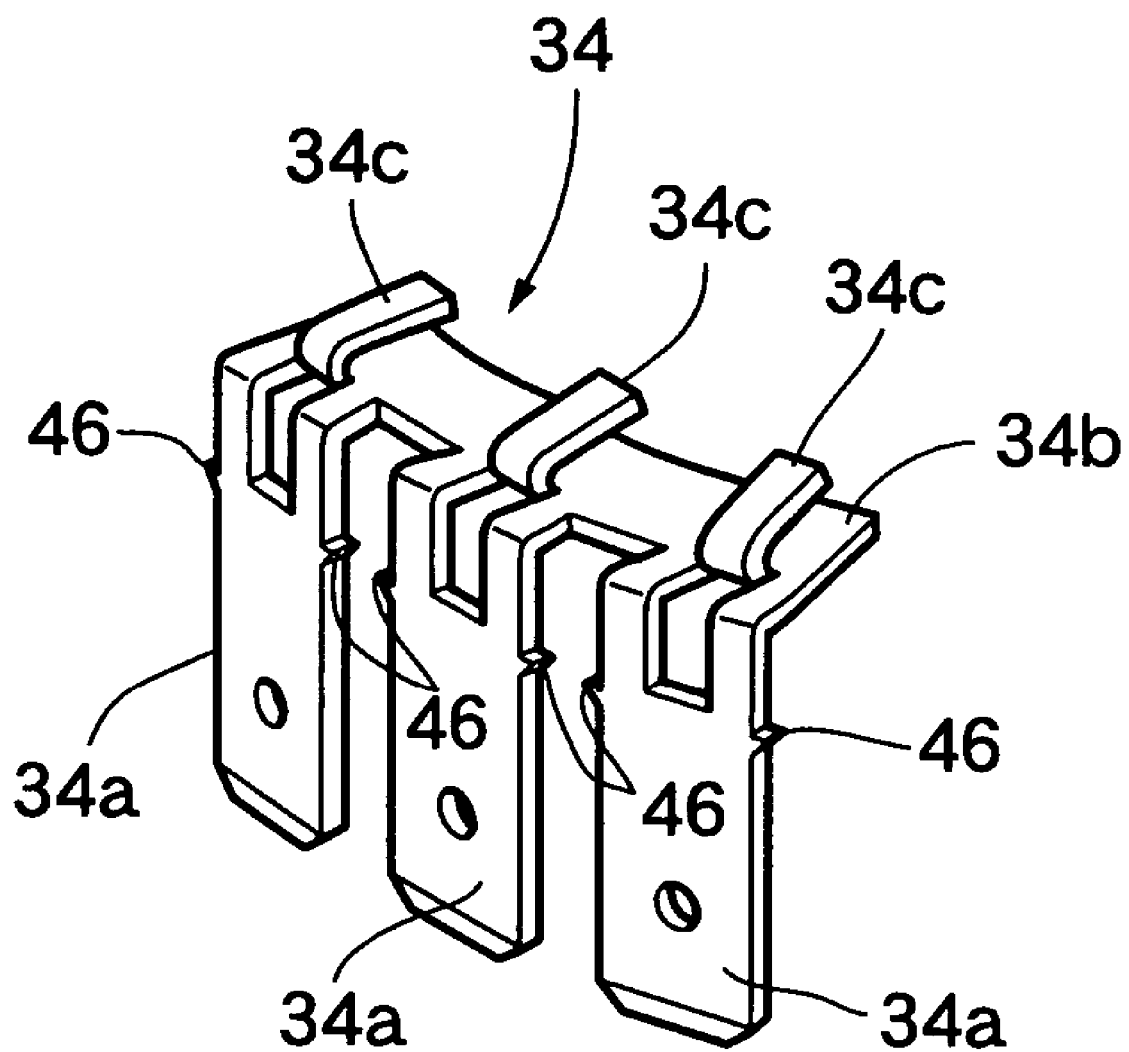

In FIG. 7, the connecting terminal 34 is made of a conductive metal so as to have three integral external conductor connection terminal portions 34a that are fitted into and fixed to the three fitting holes 31 so that one end thereof projects from each of the fitting holes 31, a flat connecting plate portion 34b having one end thereof connected at right angles in common to the other end of the external conductor connection terminal portions 34a and extending toward the radially inner side of the stator 8, and three clamping plate portions 34c provided so as to be connected to the connecting plate portion 34b so that the lead wires 35 can be held between the clamping plate portions 34c and the other end portion of the connecting plate portion 34b and connected by fusing.

The external conductor connection terminal portion 34a is formed in a flat plate shape in order to be fitted into the fitting hole 31, and has its length set so that one end thereof projects from the fitting hole 31 when fitted into the fitting hole 31 until the connecting plate portion 34b abuts against the bobbin 24. Moreover, a pair of barbs 46 are provided on opposite sides of each of the external conductor connection terminal portions 34a, the barbs 46 biting into inner faces on either side of the fitting hole 31 so as to prevent the external conductor connection terminal portion 34a from becoming detached from the fitting hole 31.

Assembly of such a connecting terminal 34 to the bobbin 24 and connecting the lead wire 35 by fusing to the connecting terminal 34 are also carried out in the same manner as in the assembly of the connecting terminal 32 to the bobbin 24 and connecting the lead wire 33 by fusing to the connecting terminal 32 and, furthermore, connection to an external conductor, which is not illustrated, is also carried out in the same manner as in the connection of the connecting terminal 32 and the external conductors 46.

The operation of the first embodiment is now explained. The sets of seven U-phase main coils 28U, V-phase main coils 28V, and W-phase main coils 28W, the pair of DC coils 29, and the single sub-coil 30 are wound via the bobbin 24 around the large number of projecting poles 23 provided on the outer periphery of the stator core 22, the plurality of fitting holes 31 are provided in the bobbin 24 inwardly of the coils 28U, 28V, 28W, 29, and 30 with respect to the radial direction of the stator core 22, the plurality of connecting terminals 32, 34, 36, and 39, which are made of a conductive metal, are fitted into and fixed to the fitting holes 31, the external conductors 46 are connected to one end of the connecting terminals 32, 34, 36, and 39, the lead wires 33, 35, 37, 38, 40, and 41 extending from the coils 28U, 28V, 28W, 29, and 30 are connected by fusing to the other end of the connecting terminals 32, 34, 36, and 39, and the coils 28U, 28V, 28W, 29, and 30 are thereby connected to the external conductors 46.

In the stator 8 having this arrangement, the connecting terminal 32 is formed from the external conductor connection terminal portion 32a fitted into and fixed to the fitting hole 31 so that one end thereof connected to the external conductor 46 projects from the fitting hole 31, the flat connecting plate portion 32b having one end thereof connected at right angles to the other end of the external conductor connection terminal portion 32a and extending toward the radially inner side of the stator 8, and the clamping plate portion 32c provided so as to be connected to the connecting plate portion 32b so that the lead wire 33 can be held between the clamping plate portion 32c and the other end portion of the connecting plate portion 32b and connected by fusing, and the inner periphery of the bobbin 24 is provided with the channel 43 having one end thereof facing said other end of the connecting plate portion 32b and having opposite ends thereof open so that one electrode 45 of the pair of electrodes 44 and 45 for connecting by fusing can pass through the channel 43.

Therefore, since one of the pair of electrodes 44 and 45 for connecting by fusing passes through the channel 43, it is possible to carry out connecting by fusing by holding the lead wires 33 extending from the coils 28U, 28V, and 28W between said other end portion of the connecting plate portion 32b and the clamping plate portion 32c while the connecting terminal 32 is fitted into and fixed to the bobbin 24, and it is unnecessary to carry out bending of a part of the connecting terminal 32 after connecting by fusing. As a result, it is possible to prevent the lead wires 33 from flexing between the coils 28U, 28V, and 28W and the parts connected to the connecting terminals 32, the so-called loose wires do not occur, and it is therefore unnecessary to subject the lead wires 33 to a treatment such as covering with an insulating tube. Furthermore, since the pair of electrodes 44 and 45 for connecting by fusing can be made thick, it is possible to reduce the time for connecting by fusing by applying a large current, thus further improving the efficiency of assembly.

Moreover, when carrying out assembly of the connecting terminal 32 to the bobbin 24 and connection of the lead wire 33 by fusing to the connecting terminal 32, a step of fixing the connecting terminal 32 to the bobbin 24 by fitting the external conductor connection terminal portion 32a into the fitting holes 31 until the connecting plate portion 32b abuts against the bobbin 24, a step of catching the lead wire 33 with the clamping plate portion 32c so that the lead wire 33 is held between the connecting plate portion 32b and the clamping plate portion 32c, a step of carrying out connecting by fusing while clamping the connecting plate portion 32b and the clamping plate portion 32c under pressure by means of the pair of electrodes 44 and 45 so that one of the electrodes 45 is inserted into the channel 43, and a step of cutting off an unwanted portion of the lead wire 33 projecting from the connecting terminal 32 are carried out in sequence, and the unwanted portion of the lead wire 33 can be cut off after fixing the connecting terminal 32 to the bobbin 24 and fusing in a state in which the bobbin 24 is set in a fusing machine for connecting by fusing, thereby improving the efficiency of assembly of the stator 8.

Furthermore, the connecting plate portion 32b is formed in a trapezoidal shape whose width reduces in going toward the radially inner side of the stator 8, and the plurality of connecting terminals 32 can be arranged close to each other along the peripheral direction of the stator 8 while ensuring that there is an insulating distance between adjacent connecting terminals 32, thus contribution to a reduction in the dimensions of the stator 8.

Moreover, the connecting terminals 36 and 39 are formed in the same manner as for the connecting terminal 32 above, and the same effects as those for the connecting terminal 32 can be obtained.

Furthermore, the connecting terminal 34 has the three integral external conductor connection terminal portions 34a fitted into and fixed to the three fitting holes 31 so that the ends thereof on one side project from the fitting holes 31, the flat connecting plate portion 34b having one end thereof connected at right angles to the other ends of the external conductor connection terminal portions 32a and extending toward the radially inner side of the stator 8, and the three clamping plate portions 34c provided so as to be connected to the connecting plate portion 34b so that the lead wires 35 can be held between the clamping plate portions 34c and the other end portion of the connecting plate portion 34b and connected by fusing, and the inner periphery of the bobbin 24 is provided with the channel 43 having one end thereof facing said other end of the connecting plate portion 32b and having opposite ends thereof open so that one electrode 45 of the pair of electrodes 44 and 45 for connecting by fusing can pass through the channel 43.

Therefore, in the same manner as for the connecting terminal 32 above, it is unnecessary to carry out bending of a part of the connecting terminal 34 after connection by fusing of the lead wires 35 extending from the coils 28U, 28V, and 28W, it is possible to prevent the lead wires 35 from flexing between the coils 28U, 28V, and 28W and the parts connected to the connecting terminal 34, loose wires do not occur, and it is therefore unnecessary to subject the lead wires 35 to a treatment such as covering with an insulating tube. Furthermore, an unwanted portion of the lead wire 35 can be cut off after fixing the connecting terminal 34 to the bobbin 24 and fusing in a state in which the bobbin 24 is set in a fusing machine for connecting by fusing, thereby improving the efficiency of assembly of the stator 8.

Figure 8:
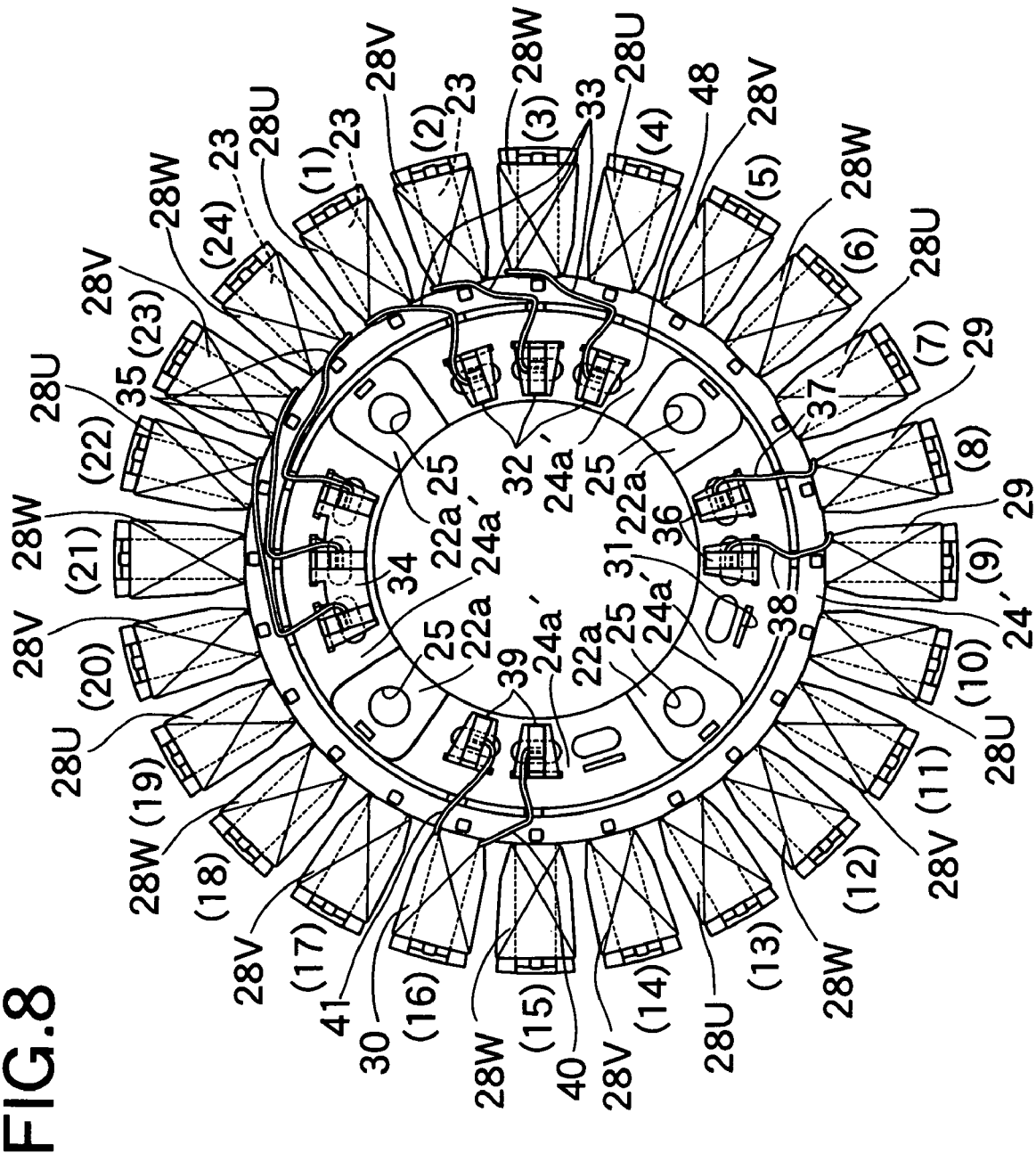

FIG. 8 and FIG. 9 show a second embodiment of the present invention, in which parts corresponding to the first embodiment are identified by the same reference numerals and symbols.

A bobbin 24' is integrally provided on one end with four protrusions 24a' protruding radially inward from the inner periphery of the stator core 22 between projections 22a thereof, and each of the protrusions 24a is provided with a plurality of, for example, three, fitting holes 31 disposed at equal intervals in the peripheral direction of the bobbin 24 at positions equidistant from the center of the bobbin 24. Fitted into and fixed to the fitting holes 31 are external conductor connection terminal portions 32a of connecting terminals 32, 36, and 39 and three external conductor connection terminal portions 34a of a connecting terminal 34.

Furthermore, the protrusions 24a' of the bobbin 24' are provided with through holes 48 for the respective connecting terminals 32, 36, and 39, the through holes 48 having one end thereof facing connecting plate portions 32b of the connecting terminals 32, 36, and 39 and having opposite ends thereof open so that one electrode 45' of a pair of electrodes 44' and 45' for connecting by fusing can pass through the through holes 48, and are provided with three through holes 48 corresponding to the connecting terminal 34, the through holes 48 having one end thereof facing a connecting plate portion 34b of the connecting terminal 34 and having opposite ends thereof open so that one electrode 45' of the pair of electrodes 44' and 45' for connecting by fusing can pass through the through holes 48.

By carrying out connecting by fusing while clamping the connecting plate portions 32b of the connecting terminals 32, 36, and 39 and the clamping plate portions 32c under pressure by means of the pair of electrodes 44' and 45' so that one of the electrodes 45' is inserted into the through hole 48, the lead wires 33, 37, 38, 40, and 41 can be connected by fusing to the corresponding connecting terminals 32, 36, and 39, and by connecting by fusing while clamping the connecting plate portion 34b of the connecting terminal 34 and the clamping plate portions 34c under pressure, the three lead wires 35 can be connected to the connecting terminal 34.

In accordance with the second embodiment, the same effects as those of the first embodiment can be exhibited, and in addition since the whole of each of the connecting plate portions 32b and 34b of the connecting terminals 32, 36, 39, and 34 is carried on the bobbin 24', a state in which each of the connecting terminals 32, 36, 39, and 34 is mounted on the bobbin 24' is made stable.

Although embodiments of the present invention are explained above, the present invention is not limited to the embodiments and can be modified in a variety of ways without departing from the scope and spirit of the present invention described in the claims.

The invention claimed is:

1. An outer rotor type multi-pole generator stator in which a plurality of coils are wound, via a bobbin, around a plurality of projecting poles provided on an outer periphery of a stator core, and a plurality of connecting terminals manufactured from a conductive metal are fitted into and fixed to a plurality of fitting holes defined in the bobbin inwardly of the coils relative to a radial direction of the stator core, each connecting terminal having one end thereof connected to an external conductor and having the other end thereof connected, by fusing, to a lead wire extending from the coil, wherein each of the connecting terminals comprises an external conductor connection terminal portion fitted into and fixed to the fitting hole, wherein one end thereof is connected to the external conductor and projects from the fitting hole, a flat connecting plate portion having one end thereof connected at right angles to the other end of the external conductor connection terminal portion and extending toward a radial inner side of the stator, and a clamping plate portion connected to the connecting plate portion wherein the lead wire is held between the clamping plate portion and the other end portion of the connecting plate portion and connected by fusing, and wherein a channel or a through hole is defined in the bobbin and has one end thereof facing said other end of the connecting plate portion and a diameter larger than a diameter of the fitting hole wherein one electrode of a pair of electrodes extends into the channel or through hole.

2. The outer rotor type multi-pole generator stator according to claim 1, wherein the connecting plate portion has a trapezoidal shape with a width which decreases in a direction going toward the radial inner side of the stator.

3. An assembly method for the outer rotor type multi-pole generator stator according to claim 1 or claim 2 wherein, when assembling the connecting terminals to the bobbin and connecting the lead wire, by fusing, to the connecting terminal, the method comprises the following, sequential steps:

a step of fixing each of the connecting terminals to the bobbin by fitting the external conductor connection terminal portion into the fitting hole until the connecting plate portion abuts against the bobbin;

a step of clamping the lead wire between the connecting plate portion and the clamping plate portion;

a step of clamping the lead wire between the connecting plate portion and the clamping plate portion using pressure from the pair of electrodes wherein the one electrode is inserted into the channel or the through hole, and a step of cutting off an unwanted portion of the lead wire projecting from the connecting terminal.

4. The outer rotor type multi-pole generator stator according to claim 1, wherein each opposing side surface of the external conductor connection terminal portion includes a barb extending away therefrom.

* * * * *